Figures 4, 5:
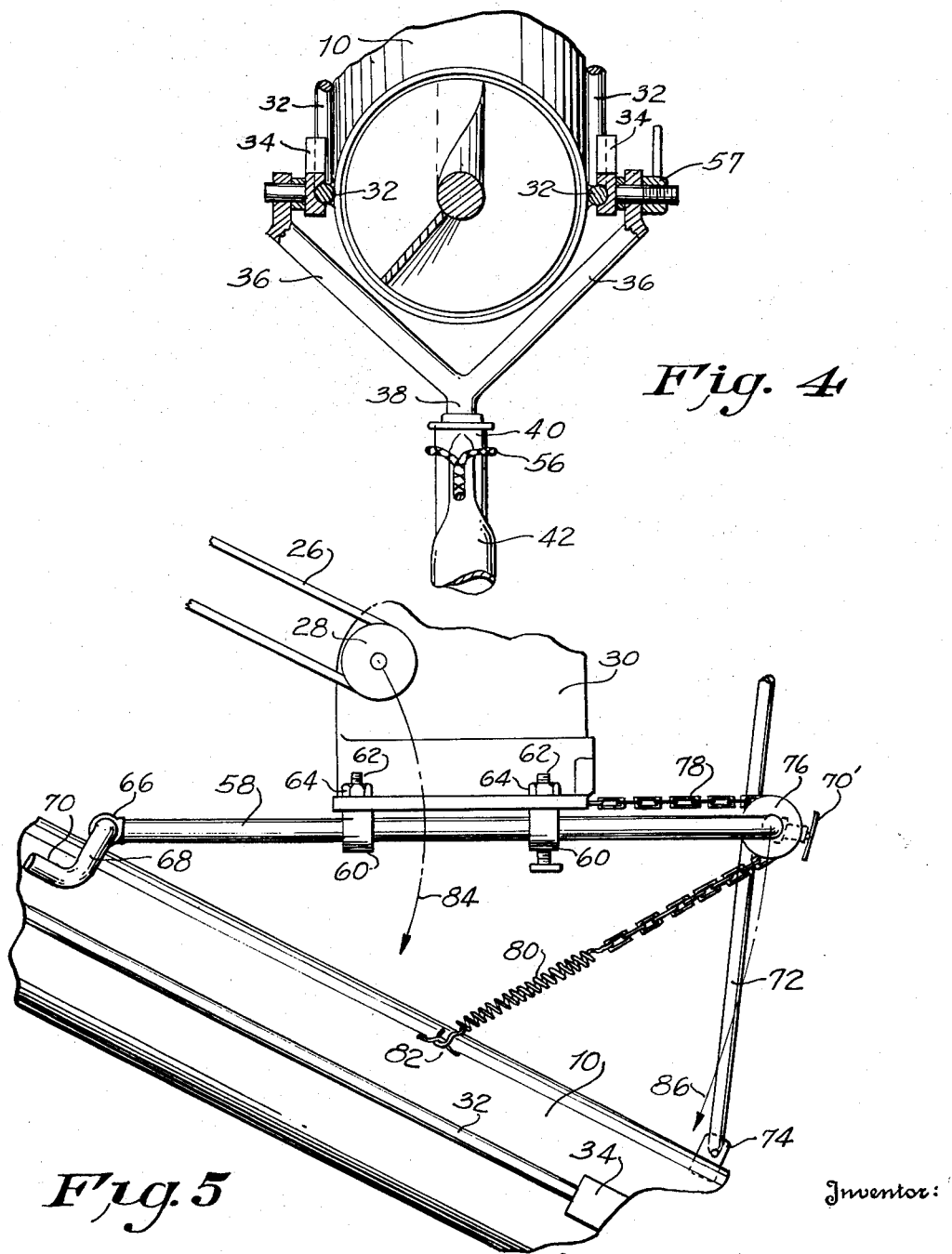

May 22, 1956  L. C. WILCOXEN  2,746,592
POWER OPERATED LOADER
Filed March 1, 1951
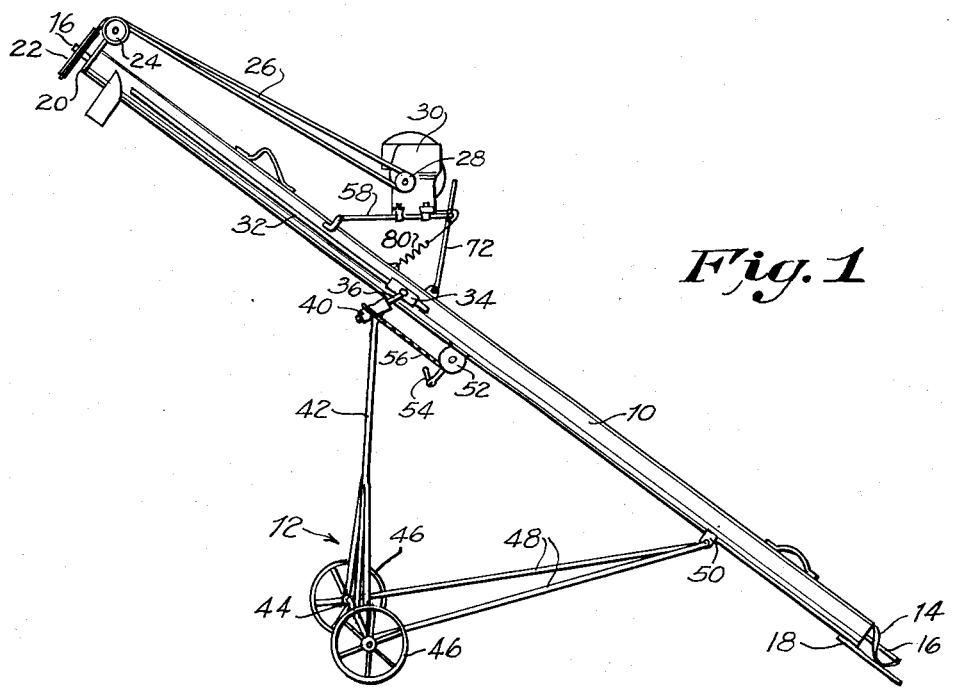
Fig. 1
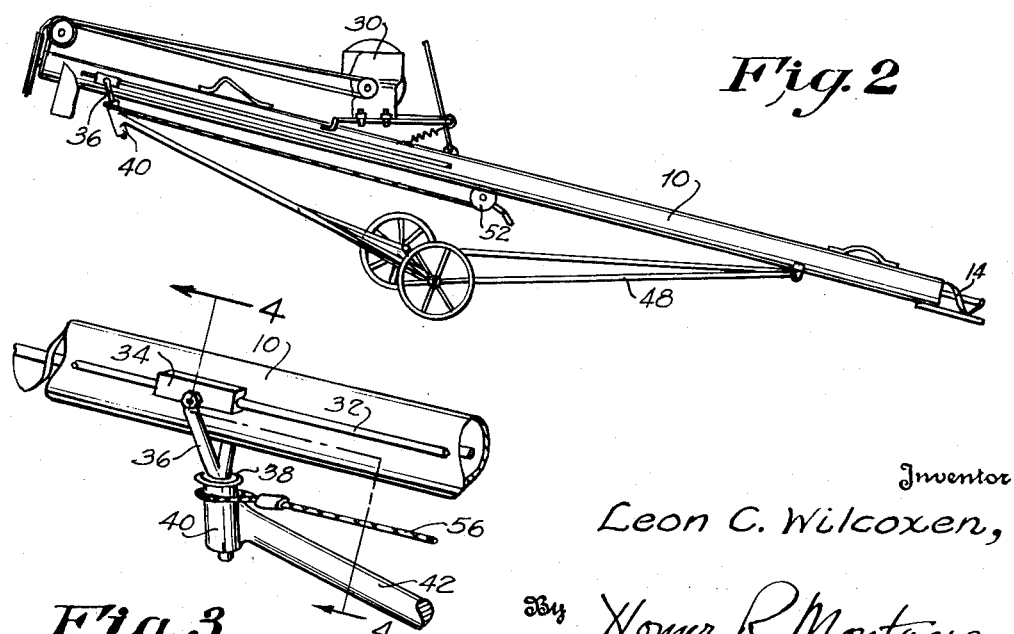
Fig. 2
Fig. 3
Inventor:
Leon C. Wilcoxen,
By Homer R. Montague
ATTORNEY May 22, 1956  L. C. WILCOXEN  2,746,592
POWER OPERATED LOADER
Filed March 1, 1951  3 Sheets-Sheet 2

Inventor:
Leon C. Wilcoxen,
By Homer R. Montague
ATTORNEY

May 22, 1956   L. C. WILCOXEN   2,746,592
POWER OPERATED LOADER

Filed March 1, 1951   3 Sheets-Sheet 3

Inventor:
Leon C. Wilcoxen,
By Homer R. Montague
ATTORNEY

United States Patent Office 2,746,592
Patented May 22, 1956

2,746,592
POWER OPERATED LOADER

Leon C. Wilcoxen, Dodge City, Kans., assignor to Mayrath Machinery Co., Inc., Dodge City, Kans., a corporation of Kansas Application March 1, 1951, Serial No. 213,317

5 Claims. (Cl. 198—120.5)

This invention pertains to power operated conveyors, and particularly to the relatively portable type utilizing a power driven auger or the like for lifting or conveying fluent materials relatively short distances such as from one pile to another or into or out of bins, silos, truck bodies or the like. Such conveyors find wide use in agricultural operations, particularly for the loading and unloading of wheat, shelled corn and similar granular products, but they are also useful for the handling of such fluent materials as sand, coal, and even water.

It is a principal object of my invention to provide a conveyor or loader of the above type which is equally well adapted for operation upon a wheeled framework or the like, so that it can be trundled from place to place in the usual manner of a wheeled conveyor, or alternatively can be supported upon a bracket or the like secured to a truck body, bin wall, or similar support for loading and unloading operations. The device of the invention, therefore, incorporates features which greatly add to the convenience and flexibility of use of the machine.

Another object of the invention is to provide a loader of this type with means for supporting an engine upon the auger tube in such a way that the engine can be brought to a level condition regardless of the inclination of the auger tube to the horizontal. Since this leveling adjustment involves a variation in the distance from the driven pulley on the auger shaft to the driving pulley on the engine, another object of my invention is to provide an engine mounting which will automatically achieve and maintain the proper belt tension irrespective of changes in engine position incident to the leveling adjustment.

A further and very important object of my invention is to provide a loader of this type with a support arrangemnt which permits both vertical and horizontal rotation of the loader with reference to its relatively fixed support, and in such a way that these adjustments, or any combination of them, can be carried out while the device is in operation, so that it is very easy to adjust the device to pick up material at any desired point and deliver it to any other desired point within the dimensional limits of the apparatus.

Still another object of the invention is to provide a loader of the auger type in which the point of connection of the main support for the auger tube can be varied along a substantial part of the length of said tube, or, to state it another way, which permits the auger tube to be slid lengthwise along its major support. This latter feature enables a ready adjustment of the inclination of the conveyor, and is also valuable in connection with its use as a truck loader, as will appear more fully in connection with the detailed description of the device.

A further object of the invention is to provide an improved arrangement of a manually operated winch which is used to adjust the height of the discharge end of the auger tube, and which is also used for handling the device between its various positions when used as a truck loader.

Figure 6:
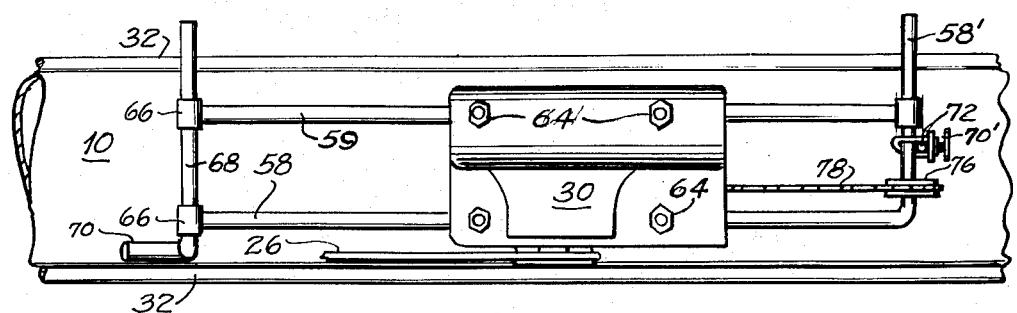
Figure 7:
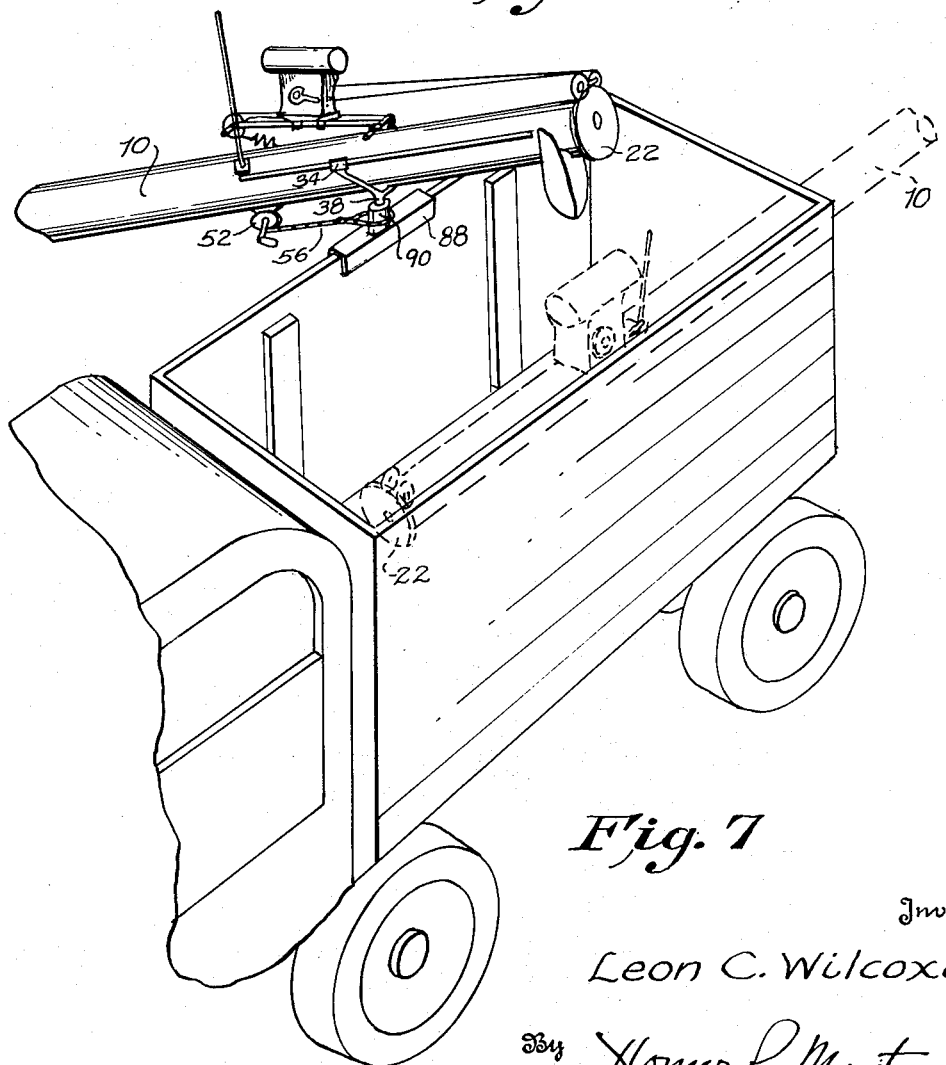

The above and other objects of the invention will best be understood by referring to the following detailed description of a preferred embodiment of the invention, taken in connection with the appended drawings, in which:

Fig. 1 is a side view of the complete device with the auger tube carried by a wheeled framework and adjusted for maximum height of the discharge end, Fig. 2 is a similar view but with the discharge height adjusted to its minimum value, Fig. 3 is a fragmentary view, to a larger scale, showing a detail of the pivotal support for the auger tube, Fig. 4 is a vertical sectional view taken on line 4—4 of Fig. 3, Fig. 5 is a fragmentary view, to a larger scale, of the engine mount portions of the device, Fig. 6 is a plan view of the engine mount of the invention, and Fig. 7 is a view illustrating the application of the device as mounted upon a truck body or similar wall structure.

Referring first to Figs. 1, 2 and 3 of the drawings, the loader or conveyor of my invention is shown as comprising a main auger tube 10 which is carried by a wheeled framework generally designated by numeral 12. However, the loader is also intended for use with a mounting carried by the side wall of a truck, bin or the like, as will be pointed out below. Since many of the advantageous features of the present invention are achieved, regardless of the type of underlying support, it is to be understood that the invention is not to be taken as limited, in its entirety, to the use of a wheeled-supporting framework.

The auger tube 10 contains an auger 14 including its center shaft 16, these parts extending within tube 10 for its full length. A foot 18 is secured to the underside of tube 10 at its intake end to support the protruding portion of auger 14 just above ground level. At the opposite or exhaust end of tube 10, a bearing plate 20 provides a bearing for the shaft 16 extending past the upper end of the tube, and a driven pulley 22 is fixedly secured to the upper end of said shaft. The bearing plate also acts as a support for idler pulleys of which one is designated by numeral 24, these pulleys serving to guide the belt 26 which passes around pulley 22 at one end and the driving pulley 28 at the other. Driving pulley 28 is secured to the crankshaft of the prime mover, which may be for example a gasoline engine 30 or an electric motor. One exemplary arrangement of the bearing plate 20, driven pulley 22 and idlers 24 is well shown in the U. S. Patent to Mayrath, No. 2,483,290.

Loaders or conveyors of the type with which the present invention is concerned are used under widely varying conditions, and it is very desirable that the height of the discharge end be made adjustable, both because of the various heights to which it might be desired to elevate the material, and because the horizontal distance which the material is moved should also be controllable on occasion. The present invention accomplishes this result by means which are adapted to the purpose whether the loader is supported on a wheeled framework, or upon a relatively more fixed support such as a truck body. To this end, a pair of guide formations 32, of which one is visible in Figs. 1 to 3, are fixedly secured (as by welding) along the opposite sides of the upper portion of tube 10, and parallel to its axis. These guide formations may be of any desired cross-sectional shape, and in the present embodiment they are rods of circular cross-section welded to the tube 10 at spaced points along their length. As best shown in Fig. 4, these guide formations 32 slidably cooperate with slide blocks 34 each of which has a semi-circular groove to match the shape of the guide formations 32. These slide blocks are provided with outwardly extended studs mounted for pivotal movement at the extremity of the arms 36 of a yoke whose center leg 38 is provided with a bearing formation adapted to be received for rotation in a socket 40. When the loader is to be used with a wheeled framework, the latter preferably comprises a standard or post 42 carrying the socket 40 fixedly at its upper end, said socket having its bearing axis at an angle in the neighborhood of 45° to the length of post 42. The lower end of post 42 may be secured fixedly to an axle 44 carrying the wheels 46 at its ends, or it may terminate in a sleeve which encircles the axle. Diagonal braces extending from an intermediate point on post 42 to points on the axle 44 adjacent its ends, also provide for strength and stability.

Tie-rods 48 are secured to the axle 44, or to sleeves thereon, and converge toward, and are pivotally secured to, a fixed bracket 50 secured to the underside of tube 10 at a point above the lower or intake end of the device. With this construction, it is clear that the inclination of tube 10, and hence the height of the discharge end above ground, can be varied by causing slide blocks 34 to move along the guide formations 32; Figs. 1 and 2 show the device in positions of maximum and minimum elevation of the discharge end, respectively. In order to provide means for adjusting the inclination of the tube, a winch 52 having a hand crank 54 is fixed to the underside of tube 10, and a cable 56 extends from the drum or shaft of said winch and is tied about the socket 40. Looking at Fig. 2, it is obvious that turning the crank 54 will wind up the cable 56 onto the winch, and pull yoke 36 rearwardly along the guide rod formations 32, to elevate the auger tube 10 to the desired point; similarly, the tube may be lowered by unwinding cable from winch 52 thus allowing the yoke 36 to move forwardly under the weight of the tube, engine and associated parts. Winch 52 is preferably provided with a ratchet or other form of locking means. A clamping means 57, shown in Fig. 4, may also be provided for enabling the slide blocks 34 to be clamped against formations 32 either to regulate the speed with which the loader feeds into a pile of grain or the like, as described below, or to clamp the parts tightly together when the loader is being transported in its stowed position on a truck as described in connection with Fig. 7 of the drawings.

The structural elements described above provide for the control of the inclination of the auger tube. However, it is highly desirable that the engine 30 be mounted in approximately level condition regardless of the adjustment of the auger tube. This is important not only to prevent deterioration of the engine which may result if it is operated in inclined positions for a sufficient length of time, but also because many engines have fuel systems which will not operate for long periods with the engine inclined too much from its normal position. For this reason, the present invention provides an engine mount which permits the engine to be levelled at any desired elevation of the auger tube, and also automatically maintains the proper belt tightness regardless of changes in auger tube inclination.

As best shown in Figs. 5 and 6 of the drawings, the engine mount comprises a pair of slide rails 58, 59 which are parallel to one another and slidably receive collars 60 having threaded studs 62 upon which the base of the engine or motor may be fastened as by nuts 64. As seen in the top view, Fig. 6, both slide rails 58 and 59 have collars 66 at their left-hand ends, these collars being free to rotate upon a bearing bracket 68 running crosswise above the tube 10 and secured at one end to the tube 10 as by having its angular end-portion 70 welded to the tube. At its right end, rail 58 is turned to provide a portion 58' extending parallel to the bracket 68, and the right-hand end of rail 59 has a collar which can slide along the portion 58'. Thus, the distance between rails 59 and 58 may be adjusted by sliding the former upon bracket 68 and portion 58', so as to accommodate engines having various spacings between their mounting holes. Different spacings of mounting holes in the fore-and-aft direction of the engine are accommodated by the fact that collars 60 are slidable along rails 58 and 59. The inclination of the rails 58 and 59 to tube 10, and therefore to the ground, can be adjusted as shown in Fig. 5 by swinging rails 58 and 59 about the bearing provided by bracket 68. The mount can be locked in the desired position by a hand-operated clamp 70' carried by the portion 58' of rail 58 and slidably encircling a support rod 72 whose lower end is pivotally secured to a bracket 74 welded to tube 10.

The different positions of the engine mount and of the engine carried thereby will be obvious upon inspection and comparison of Figs. 1 and 2 of the drawings. The back-and-forth motion of the engine 30 along the rails 59, not only provides for the use of belts of slightly different lengths and for the natural increase in belt length with use, but also permits proper driving tension to be maintained in the belt at the extreme positions of Figs. 1 and 2 and at all intermediate positions. Variation in the position of the engine is necessary because the swinging of the engine mount necessary to keep the engine level involves a change in the distance between the engine pulley 28 and the idlers and driven pulleys 24 and 22.

In order to provide for the automatic maintenance of proper driving tension in belt 26 as the engine is moved between various positions incident to its leveling, the present invention provides a novel automatic spring tensioning device which will now be described.

A pulley 76 is mounted for free rotation at the outer end of the engine mount, for example upon the cross-piece of the U-shaped member providing the rails 58, and a length of chain 78 or the like is secured at one end to the engine 30 or to one of the sleeves 60, passes around pulley 76, and is connected by a helical spring 80 to an anchor loop or bracket 82 secured to the upper side of the auger tube at a point midway between the bearing 68 of rails 58 and the pivot bracket 74 of support rod 72. The reason for this arrangement is that it enables a considerable change in the position of engine 30 along rails 58 while maintaining approximately constant tension in spring 80 and hence upon belt 26. As is well known, the tension exerted by a helical spring is proportional to its elongation. Inspection of Fig. 5 will show that if engine 30 were secured immovably upon rails 58, and the auger tube inclination were reduced, the angle between rails 58 and the auger tube would have to be reduced by the same amount in order to maintain the engine level. However, the center of the engine pulley 28 would move along the arcuate path designated by arrow 84 with relation to the auger tube, and thus the pulley would move away from the idler pulleys 24 at the upper end of the tube. In order to maintain the same distance between the idler or the driven pulleys and the engine pulley, engine 30 must be allowed to move forward on rails 58, this change of position being clearly shown in Figs. 1 and 2. If it were attempted to maintain belt tension by merely connecting a helical spring or like device between the engine 30 and the right-hand end of the engine mount, the percentage elongation of this spring would necessarily undergo a very substantial change, which means that a much higher tension would be exerted on the belt 26 with the auger tube in its lowest inclination than would be the case when the auger was elevated to its Fig. 1 position.

The arrangement of the present invention avoids this by transmitting the spring tension to the engine over pulley 76 from the point 82 located intermediate the pivot point 68 and 74. With this arrangement, the forward motion of the engine 30 along guide rails 58 tends to elongate spring 80, but since this forward motion is accompanied by (and in fact, results directly from) a reduction in the angle between guide rails 58 and the auger tube, such elongation of spring 80 is approximately neutralized because at the same time the axis of pulley 76 is traveling along an arcuate path designated by arrow 86, which shortens the distance between point 82 and pulley 76. With the arrangement shown, the total distance as measured from the lower end of spring 80, around pulley 76 and thence to the point of connection of chain 78 to engine 30, can be made very nearly constant, so that the desired tension on belt 26 does not vary substantially even though the engine moves a considerable amount along guide rails 58.

A further comparison of Figs. 1 and 2 will illustrate an additional advantage that is obtained by the engine mounting arrangement just described. It will be seen from these figures that the general direction of belt 26 at points adjacent engine pulley 28 makes a variable angle with the plane of the engine-supporting rails 58, this angle being greater when the loader is in its position of maximum elevation (Fig. 1). Assuming constant tension imparted by spring 80 to the engine, directed (as it will be by virtue of pulley 76) along the rails 58, the actual tension transmitted to belt 26 will vary inversely as the cosine of the angle between the belt and the engine slide rails. This provides some additional effective belt tension when the loader is at maximum elevation, which is the condition (other factors being equal) under which maximum power must be delivered from the engine 30 to the auger 14.

The above description deals with the operation of the device in connection with a wheeled framework. However, as best shown in Fig. 7 of the drawings, the conveyor portion of the device is equally well adapted for mounting upon a truck body, bin, granary window or the like. As shown in that figure, a bracket 88 of channel section is provided with an upstanding bearing socket 90 adapted to receive the bearing formation of the center leg 38 of the yoke, the channel section itself being open downwardly so as to rest solidly upon a side or rear rail of a truck or equivalent wall structure. The radius rods 48 of Figs. 1 and 2 have been disconnected from pivot bracket 50 for this application of the invention, and of course the end of cable 56 which was formerly looped about the socket 40 is now looped about the socket 90.

If the slide bars 34 are at the ends of bearing formations 32 nearest the exhaust end of the auger tube when the yoke bearing leg 38 is inserted in socket 90 (which facilitates mounting the loader because its center of gravity need not be raised so high in the air), then the winch 52 may be used to raise the auger tube to vary its inclination and thus to deliver the material being loaded at points nearer or farther from the side of the truck which carries the loader. The importance of the pivotal mounting between the yoke and its socket is now apparent, because it permits the truck-mounted loader to be swung horizontally to pick up material from different portions of a pile beside a truck, and of course this swinging movement will also serve to distribute such material to different parts of the truck body. The same remarks apply also to loading material into or out of a bin or the like.

If loading into a truck or the like is being accomplished, the sliding relationship between the fixed supporting yoke and the auger tube also permits a self-feeding type of operation. Thus, with the intake end of the loader buried in a pile of grain beside the truck, and the loader at a relatively high inclination, the winch 52 may be backed off (or cable 56 may be disconnected from socket 90), leaving the auger tube 10 free to eat its way into the pile of grain. The rate of speed of this self-feeding movement may be varied if desired by the adjustable clamping means 57 of Fig. 4. This type of operation greatly reduces the amount of manual shoveling required in the operation of loading a large pile of grain or the like into a truck.

When operations have been completed, the loader can conveniently be stowed in the dotted line position of Fig. 10, without moving bracket 88, merely by elevating the intake end so that the auger tube lies along the top of the wall of the truck body. This is shown, for clarity, on the opposite side of the truck body. Winch 52 may then be employed to pull the entire auger tube forwardly so as to reduce the overhang of the tube behind the truck, and the rear portion of the tube securely lashed to a suitable fixed part of the truck body.

An additional advantage of the slidable relation between the yoke and the auger tube lies in the fact that the truck on which the loader is mounted can be driven close to the doorway of a granary and the loader then slid through the doorway. This eliminates the necessity of either removing the loader from the truck or swinging it into the doorway as the truck is jockeyed into position. It should be noted that it is not necessary to change the position of the truck wall bracket 88 when changing from loading operations to transport, and the bracket may be left in the approximate center of the length of the truck body which is the preferred position for loading.

I have described the invention in accordance with a preferred embodiment given by way of illustration, but it is clear that many changes and modifications as to details may be made without departing from the spirit of the invention, and I intend to claim all such modifications as fall within the scope of the appended claims.

I claim:

1. In a power operated conveyor, an auger tube, an auger in said tube, an engine support pivotally mounted on said tube and comprising engine supporting rails adapted to receive an engine for sliding motion in a direction generally lengthwise of said auger tube, means for adjusting the inclination of said engine support relative to said auger tube, means including a flexible tension-transmitting element connected to said auger tube at a point spaced from the pivotal connection of said engine support and adapted for connection with an engine mounted on said rails to urge said engine toward one extremity of said rails, with a force substantially independent of the inclination of said engine support, a driven pulley connected to said auger at that end of said tube nearest the other extremity of said rails, and a drive belt for connecting said driven pulley with said engine.

2. The invention in accordance with the preceding claim, and pivotal means for supporting said auger tube in an adjustable inclined position.

3. In combination, an auger conveyor comprising a tube, an auger in said tube, a driven pulley connected to said auger at one end of said tube, means for supporting said tube at various inclinations to the horizontal, an engine supporting platform pivoted at one of its ends upon said tube and extending in a direction generally away from said driven pulley, means for supporting the other end of said platform at an adjustable distance from said tube to permit leveling, a guide element at said other end of said platform, a belt connecting said engine with said driven pulley, a tension spring having one end connected to said tube at a point beneath said platform, and a flexible motion-transmitting connection extending from the other end of said spring around said guide element and connected to said engine to urge the same in a direction to tension said belt.

4. A power operated conveyor adapted for mounting selectively upon a wheeled framework or a relatively fixed support bracket, comprising an auger tube having an auger therein, bearing slides secured to said tube and extending lengthwise on opposite sides thereof from a point midway of the length of said tube to a point adjacent one end thereof, a support yoke for said tube comprising a cylindrical bearing element, yoke legs diverging from said bearing element, and slide blocks pivotally connected to said yoke legs and disposed for sliding engagement with said respective bearing slides, whereby said auger tube may be supported by said cylindrical bearing element when the latter is engaged with a socket carried either by a wheeled framework or upon a relatively fixed support bracket.

5. The invention in accordance with claim 4, and a winch device secured to said auger tube and having a cable for connection with a socket of a supporting structure.

References Cited in the file of this patent

UNITED STATES PATENTS

| | | |
|---|---|---|
| 1,526,045 | Brown | Feb. 10, 1925 |
| 2,438,527 | Werner | Mar. 30, 1948 |
| 2,492,341 | Walters | Dec. 27, 1949 |
| 2,516,192 | Ensinger | July 25, 1950 |
| 2,528,917 | Slocum | Nov. 7, 1950 |
| 2,551,147 | Mayrath | May 1, 1951 |
| 2,560,823 | Roscoe | July 17, 1951 |
| 2,572,290 | Vutz | Oct. 23, 1951 |
| 2,573,908 | Hyman | Nov. 6, 1951 |
| 2,583,082 | Bobrowski | Jan. 22, 1952 |
| 2,615,560 | Robinson | Oct. 28, 1952 |

FOREIGN PATENTS

| | | |
|---|---|---|
| 521,752 | France | July 19, 1921 |